Sept. 23, 1958
D. T. AYERS, JR
2,852,921
BOOSTER BRAKE MECHANISM
Filed Sept. 13, 1954
3 Sheets-Sheet 1
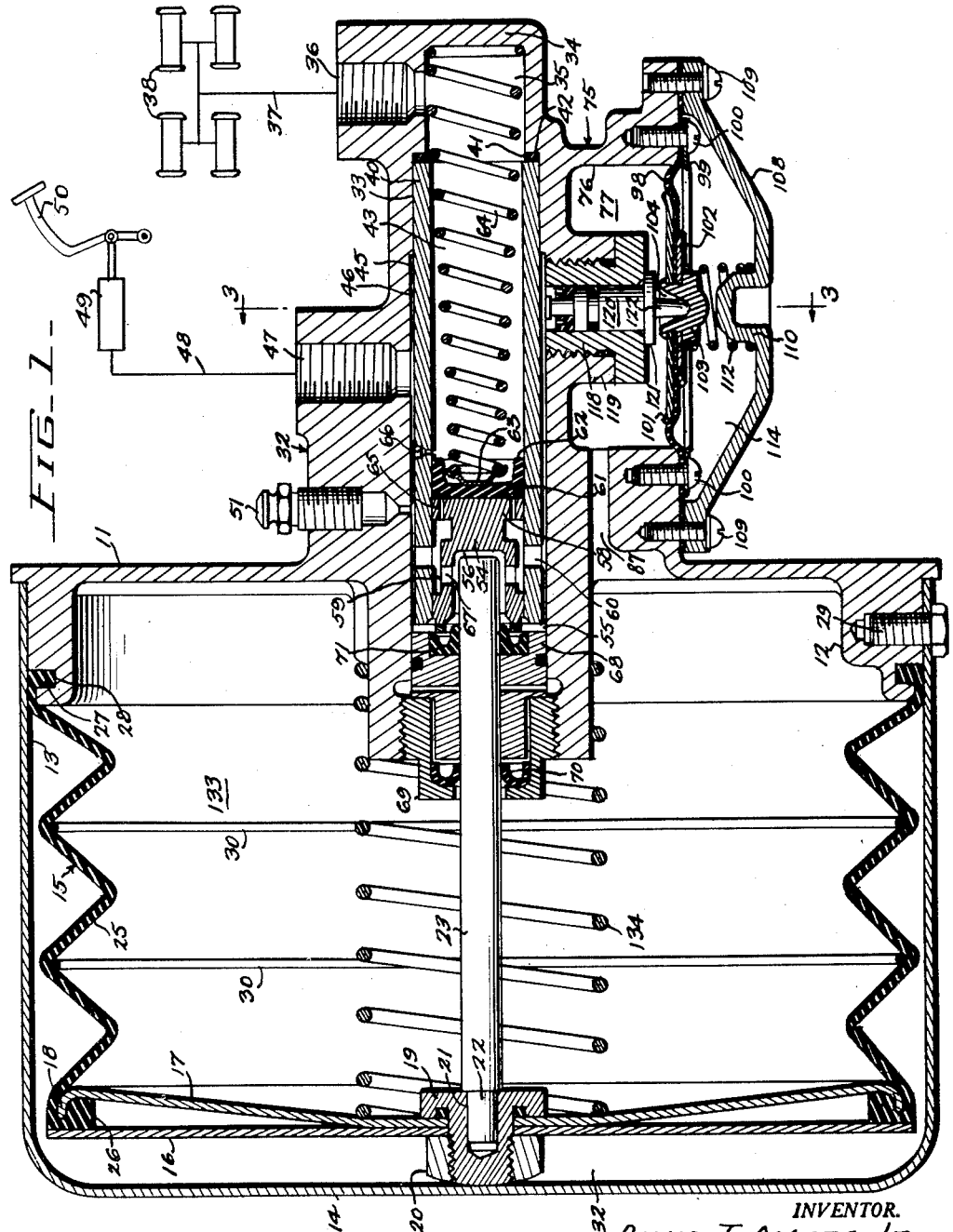
INVENTOR.
DAVID T. AYERS JR.
BY
John K. Phillips
ATTORNEY

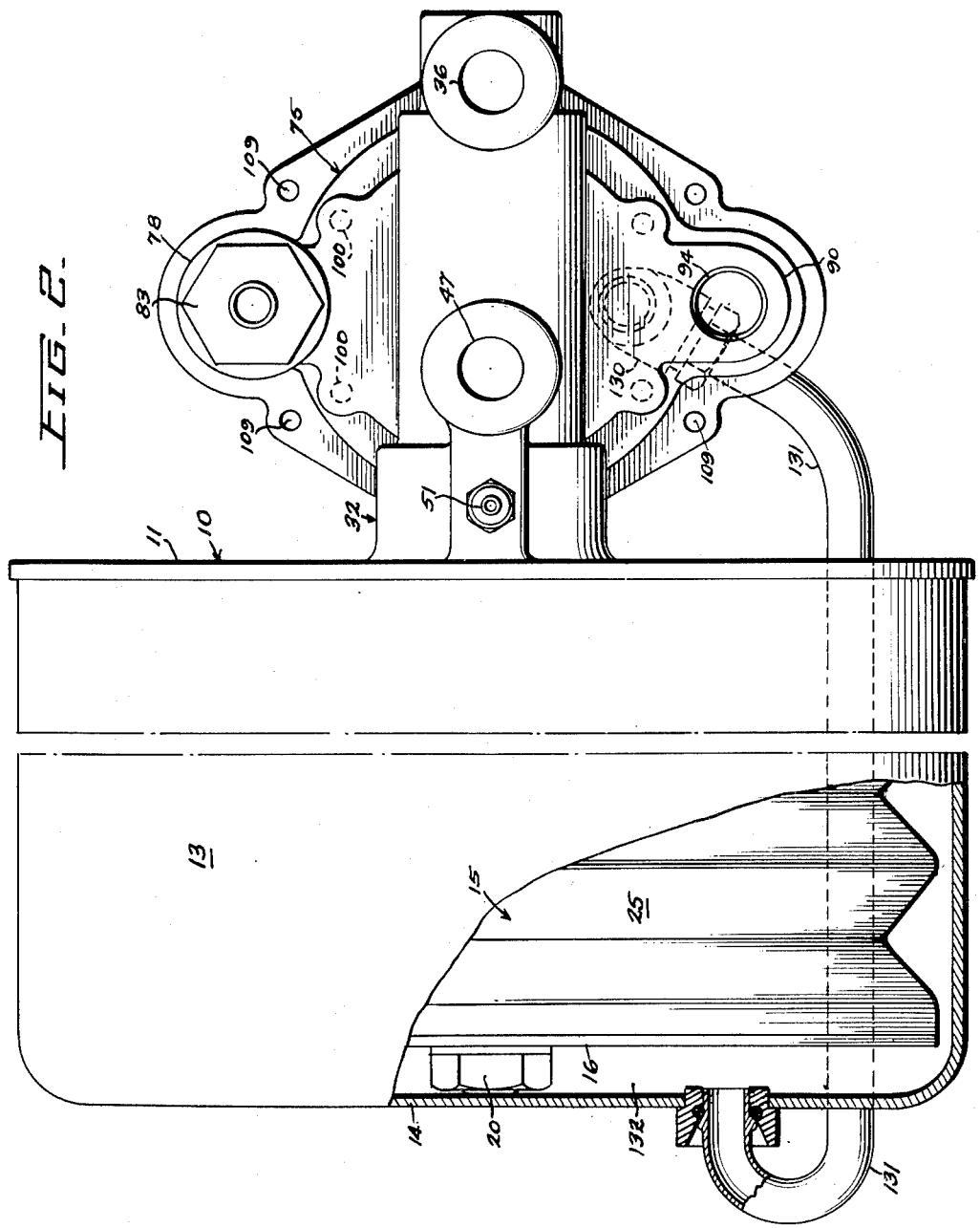

Sept. 23, 1958   D. T. AYERS, JR   2,852,921
BOOSTER BRAKE MECHANISM
Filed Sept. 13, 1954   3 Sheets-Sheet 3
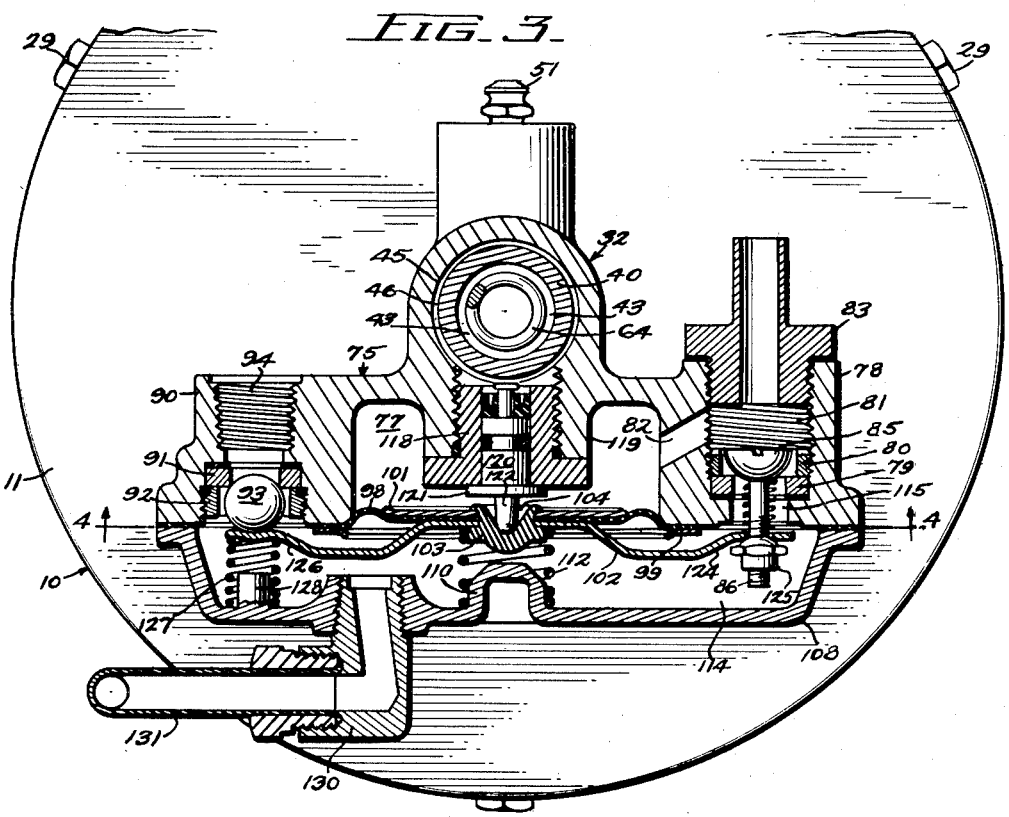
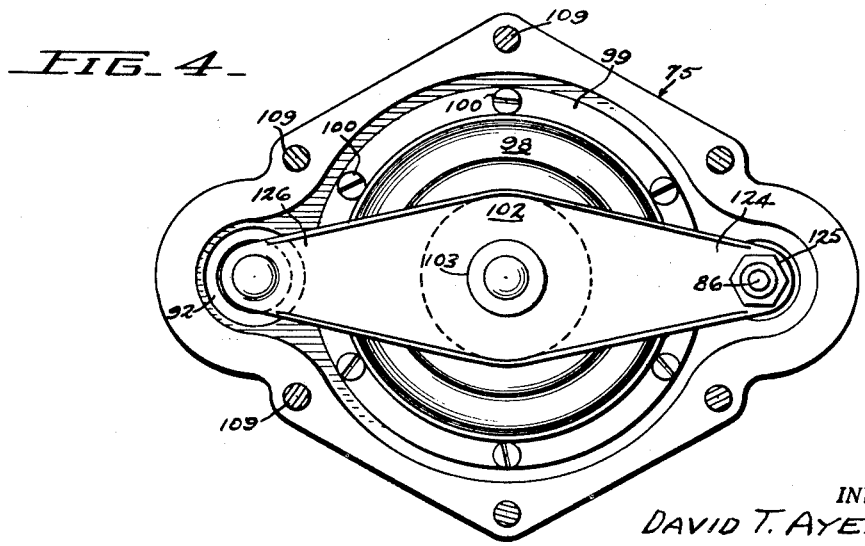
INVENTOR.
DAVID T. AYERS JR.
BY
John V. Phillips
ATTORNEY

United States Patent Office 2,852,921
Patented Sept. 23, 1958

2,852,921

BOOSTER BRAKE MECHANISM

David T. Ayers, Jr., Birmingham, Mich., assignor to Kelsey-Hayes Company, a corporation of Delaware Application September 13, 1954, Serial No. 455,509

9 Claims. (Cl. 60—54.6)

This invention relates to a booster brake mechanism, and more particularly to that type of mechanism which utilizes displacement of fluid from a conventional master cylinder for energizing a booster motor and for assisting such motor in applying the brakes.

Numerous types of booster brake mechanisms of the character referred to have been developed. Such mechanisms provide a booster motor employing a follow-up valve mechanism which operates to energize the booster motor upon displacement of fluid by pedal actuation of a conventional master cylinder. Apparatus of this type employs its own master cylinder from which fluid is displaced by movement of a plunger connected to the booster motor, and fluid from the pedal-operated master cylinder flows behind such plunger to assist the motor in displacing fluid into the brake cylinders, the operator thereby performing part of the work and the brake pedal being provided with reaction "feel" proportional to the hydraulic pressure in the fluid displaced into the wheel cylinders. In prior constructons, the plunger which displaces fluid into the wheel cylinders has been provided with a passage therethrough adapted to be closed by a valve in the nature of a check valve, and such valve has been provided with means for maintaining it in open position when the parts are in the normal off positions, thus normally establishing balanced pressures on opposide sides of the fluid displacing piston and providing for replenishment of any fluid leaking from the brake lines. The means referred to also permits the residual pressure valve of the conventional master cylinder to function for its intended purpose, expansion and contraction throughout the entire system being permitted because of the maintenance in open position of the check valve in the plunger. This check valve and the means associated therewith for normally maintaining it in open position represents an appreciable item of expense in the manufacture of an apparatus of this character.

It also has been the common practice to provide either of two types of booster motors, one such type employing a piston operable in a cylinder, and the other employing a diaphragm clamped between two casing sections. The piston type motor is relatively expensive to make and the friction of the piston movable in the cylinder offers substantial resistance to movement of the piston, which is of particular importance in the event of a failure of power in the motor which required pedal operation of the piston against the relatively strong return spring. The diaphragm type of motor is substantially less expensive but is frequently disadvantageous in use, since the periphery of a diaphragm has to be clamped between annular outstanding flanges on the motor casing sections, which flanges, in turn, were clamped together by an annular clamping ring. The flanges and clamping ring, for a booster motor of given capacity, frequently makes the over-all diameter of the motor so great as to prohibit its use due to lack of installation space.

An important object of the present invention is to provide a novel brake booster mechanism of the character referred to wherein all of the advantages of the prior constructions referred to are retained, while eliminating the use in the fluid displacing plunger of a spring-pressed check valve together with the means for maintaining such valve in open position when the parts of the mechanism are in normal off positions.

A further object is to provide such an apparatus wherein the fluid sealing means of the fluid displacing plunger is utilized for permitting flow of hydraulic fluid from the conventional master cylinder in the direction of the wheel cylinders to permit the taking up of play in the brake drums prior to energization of the booster motor, while preventing reverse flow of fluid, and to provide auxiliary orifice means for balancing pressures in the system when the parts are in their normal off positions, thus providing for free expansion and contraction of hydraulic fluid throughout the system.

A further object is to provide the fluid displacing plunger with a lipped sealing cup with the lips of the cup extending in the direction of the wheel cylinders to be seated by predetermined hydraulic braking pressures while permitting radial contraction of the lip of the cup for the flow toward the wheel cylinders of fluid displaced from the conventional master cylinder upon initial depression of the brake pedal, and to provide a space back of the fluid displacing plunger which communicates with an annular fluid space to be supplied with liquid from the master cylinder, and to provide a restricted orifice between such annular space and the master cylinder of the booster mechanism just ahead of the lipped cup of the plunger whereby pressures in the system will be balanced in the off positions of the parts and initial movement of the fluid displacing plunger will close such orifice to seal the master cylinder of the booster for the generation of relatively high pressures therein.

A further object is to provide a novel type of motor for use in conjunction with the mechanism referred to wherein the advantages of a diaphragm type motor are retained while eliminating the necessity for clamping peripheral portions of the diaphragm between complementary casing section flanges and without employing a clamping ring around such flanges.

A further object is to provide such a motor which is highly simplified in construction and provides a pressure responsive unit having a flexible body whereby the rod employed for transmitting power to the fluid displacing plunger can accommodate itself, without extra bearings, to movement of the rod in bearings associated with the booster master cylinder.

A further object is to provide such an apparatus wherein the fluid displacing plunger, upon a failure of power in the motor, is movable independently of the motor and its power transmitting rod, thus making it unnecessary for the operator to move any of the motor parts for an application of the vehicle brakes.

Other objects and advantages of the invention will become apparent during the course of the following description.

In the drawings I have shown one embodiment of the invention. In this showing:

Figure 1 is an axial sectional view through the booster mechanism taken preferably in a vertical plane and diagrammatically illustrating the brake cylinders, the conventional master cylinder and the brake pedal therefor, Figure 2 is a plan view of the apparatus, parts being shown in section, Figure 3 is a section taken substantially on line 3—3 of Figure 1, and Figure 4 is a section taken substantially on line 4—4 of Figure 3, parts being shown in elevation.

Referring to Figures 1 and 2, the numeral 10 designates a booster motor as a whole comprising a preferably die cast head 11 having an annular flange 12 over which slips the open end of the cylinder 13 having a closed head 14 at the end thereof opposite the head 11. The pressure responsive unit of the motor is indicated as a whole by the numeral 15 and comprises a flat plate 16 and a slightly dished inner plate 17 having peripheral flange 18 turned toward the plate 16 for a purpose to be described. A thimble 19 engages the inner face of the plate 17 and extends through both plates 16 and 17 to receive a nut 20 to clamp the plates 16 and 17 in position with respect to each other. The thimble 19 is provided with an axial opening 21 receiving the reduced end 22 of a power-transmitting rod 23 arranged axially of the motor and performing functions to be referred to below.

Within the cylinder 13 is arranged a bellows 25 formed of any suitable flexible material and provided at one end with a grooved bead 26 into which projects the flange 18 to clamp such end of the bellows relative to the plates 16 and 17. The opposite end of the bellows is provided with an inturned flange 27 received in an annular groove 28 in the flange 12 and maintained in position upon assembly merely by slipping the open end of the cylinder 13 over the flange 12. After the assembly of the parts in this manner, radial screws 29 are employed for fixing the cylinder 13 to the head 11. The bellows 25 is prevented from collapsing by the insertion therein of suitable preferably steel wire rings 30.

The head 11 is provided with an integral body 32 projecting axially from the motor as clearly shown in Figure 1. The body 32 is provided with an axial opening 33 throughout the greater portion of its length, such opening being closed at its outer end as at 34 and defining therein a chamber 35. This chamber communicates through an outlet 36 with lines 37 leading to conventional brake cylinders 38.

Into the opposite end of the opening 33 is inserted a sleeve 40 having its extremity engaging a seal 41 arranged against a shoulder 42 formed in the body 32. The interior of the sleeve 40 forms a chamber 43 constituting the master cylinder for the booster mechanism, as will become apparent. To the left of and axially spaced from the shoulder 42, as viewed in Figure 1, the body 32 is provided with a bore 45 slightly larger than the opening 33 and forming with the sleeve 40 an annular space 46. This space communicates through a port 47 with a line 48 leading to a conventional master cylinder 49, preferably provided with the usual residual pressure valve and plunger (not shown), the plunger being operable by a conventional brake pedal 50. In filling the system, air is vented from the interior of the booster through a conventional fitting 51 communicating with the annular space 45 and forming no part of the present invention.

A fluid displacing plunger 54 is slidable in the sleeve 40 and is limited in its movement to the off position shown by an externally scalloped ring 55 maintained in position in a manner to be described. The left-hand end of the plunger 54 is axially recessed as at 56 to receive the adjacent end of the rod 23 and the extremity of this rod is slightly spaced from the bottom of the recess 56 to assure clearance to permit the plunger 54 to return fully to its off position shown in Figure 1 when the brake pedal is released.

The plunger 54 is provided at its right-hand end in Figure 1 with a head 58 back of which is an annular space 59 surrounding the plunger and communicating through ports 60 with the annular space 45. The space 59 obviously is in fixed communication with the master cylinder. A flexible cup 61 having a radially deformable lip 62 is arranged against the head 58 and is maintained in such position by a spring seat 63. This seat is engaged by one end of a return spring 64, the other end of which engages against the end 34 of the body 32. It will be noted that peripheral portions of the spring seat 63 are spaced from the cup 61, thus permitting the peripheral portions of the body of the cup to be deformed toward the right in Figure 1 and to permit the lip 62 to be deformed slightly radially inwardly when pressure in the space 59 exceeds pressure in the master cylinder 43. Under such conditions, fluid flows from the space 59 into the master cylinder 43, and to provide for such flow, the head 58 is provided with fluid passages 65.

The sleeve 40 is provided with a small port 66 in constant communication with the annular space 46, and communicating with the master cylinder 43 adjacent the edge of the lip 62 when the parts are in the off positions shown. The space 59 communicates with the recess 56 through ports 67.

The rod 23 extends through a bearing 68 mounted in the inner end of the body 32 and maintained in position by a nut 69 having a fluid seal 70 therein. The bearing 68 likewise is provided with a fluid seal 71, and the ring 55 is employed as a stop for the plunger 58 for the reason that the external diameter of the plunger is less than the external diameter of the seal 71 whereby the latter cannot be employed as a positive stop. The ring 55 is maintained in position by the bearing 68 as will be apparent.

A suitable valve mechanism, operable by fluid displacement from the conventional master cylinder 49, is employed for energizing the motor 10. The valve mechanism shown in the present case forms no part per se of the present invention, but is disclosed and claimed in the co-pending application of Jeannot G. Ingres, Serial No. 455,647, filed September 13, 1954. Referring to Figures 1 and 2, the body 32 is widened to form an integral housing 75 having depending walls 76 forming therewith in a vacuum chamber 77. At one side (Figure 3), the wall 76 is thickened to provide a boss 78 having a recess receiving in the bottom thereof a valve seat 79 maintained in position by a nut 80 threaded in the boss 78 and above which is a chamber 81 communicating with the chamber 77 through a port 82. In the upper end of the recess in the boss 78 is threaded a fitting 83 to which is connected one end of a conduit (not shown) leading to a source of vacuum such as the intake manifold of the vehicle engine. The valve seat 79 is engageable by a hemispherical valve 85 having a depending stem 86, further described below. The chamber 77 is in fixed communication with the interior of the bellows 25 through a port 87 (Figure 1).

Diametrically opposite the boss 78, the housing 75 is provided with a similar boss 90 into the bottom of which is inserted a valve seat 91 retained in position by a nut 92 and engageable by a ball valve 93. This valve is normally closed as in Figure 3, while the valve 85 is normally cracked. The opening through the valve seat 91 communicates with a port 94 suitably connected to a conventional air cleaner (not shown).

Against the bottom of the housing 75 and closing the bottom of the chamber 77 is a flexible diaphragm 98 maintained in leak-proof engagement against the bottom of the housing 75 by an annular ring 99 fixed in position by screws 100. Above the diaphragm, and of substantially smaller diameter than the chamber 77, is arranged a plate 101, while beneath the diaphragm is arranged a lever 102. A thimble 103 extends through the lever 102, diaphragm 98 and plate 101 and is peened over the latter to fix these three elements with respect to each other. The thimble 103 is provided with an upper axial recess 104 for a purpose to be described.

A dished cover plate 108 is arranged against and secured to the bottom of the housing 75 by screws 109 (Figure 1). Axially of the thimble 103, the cover 108 is provided with an upwardly extending boss 110 which is engageable with the bottom of the thimble 103 to limit downward movement thereof. The boss 110 also serves to center a compression spring 112 engaging at its lower end against the cover 108 and at its upper end against the lever 102. The cover 108 forms therewithin a chamber 114 in fixed communication through a port 115 with the interior of the valve seat 79. With the valve 85 normally cracked, therefore, the chamber 114 communicates with the chamber 81 and accordingly with the chamber 77, and the diaphragm 98 will be vacuum balanced.

A small cylinder 118 is threaded into an annular depending boss 119 formed integral with the housing 75. A sealed plunger 120 is slidable into cylinder 118 and has its upper end subject to pressures in the annular space 46. A flange 121 on the end of the plunger 120 limits upward movement of the latter, and the plunger carries a depending pin 122 engageable in the recess 104. The spring 112 normally maintains the diaphragm 98, lever 102 and associated elements in the positions shown in Figure 3.

One end 124 of the lever 102 is apertured for the projection therethrough of the stem 86. This stem carries an adjusting nut 125 engageable with the bottom of such end of the lever. The other end 126 of the lever is provided with a slight depression engaging the ball valve 93, and such end of the lever is engaged by a spring 127 having its lower end engaging the cover 108 and centered by an upstanding lug 128. The spring 127 normally maintains the ball 93 in engagement with the seat 91.

An elbow fitting 130 (Figures 2 and 3) communicates at one end with the chamber 114 and is connected at its other end to one end of a pipe 131. The other end of this pipe communicates through the motor head 14 with a chamber 132 which forms the variable pressure chamber of the motor. The bellows 25, head 11 and head 16 define the constant pressure chamber 133 of the motor. It will be obvious that when pressures are balanced in the chambers 132 and 133, all of the motor parts will be in the normal positions shown in Figures 1 and 3. The spring 64 biases the plunger 58 to the normal off position shown, while a relatively heavy return spring 134 biases the head 16 of the motor to its normal off position.

Operation

As stated, the parts are shown in their normal positions in the drawings. Under such conditions, the brake cylinders 38 are in communication with the line 48 from the master cylinder through chamber 35, master cylinder 43, port 66, annular space 46 and port 47. Accordingly, pressures will be balanced throughout the system and any expansion or contraction of hydraulic fluid at any point in the line is taken care of by the conventional residual pressure valve of the master cylinder 49.

Assuming that the brakes are to be applied, the operator will depress the brake pedal 50 to displace fluid through line 48. This fluid flows through port 47 into the annular space 46 and a restricted flow of fluid from such space into the master cylinder 43 is permitted through port 66. This port, however, does not permit a sufficiently rapid flow of fluid into the master cylinder 43 to move the brake shoes into engagement with the brake drums or to build up pressure sufficiently rapidly in the master cylinder 43 to operate the valve mechanism to energize the motor. At such point in the operation, however, fluid flows from the annular space 46 through ports 60 into the space 59, thence through passages 65 to deform the cup 61 for the flow of hydraulic fluid past the lip 62 into the master cylinder 43.

The flow of fluid in the manner just referred to is generally taken care of in a booster brake mechanism of this general type by means of a check valve associated with the fluid displacing piston. Such check valve is biased to closed position to move to such position promptly upon initial movement of the fluid displacing piston, but such valve is held open when the parts are in the off position to afford communication through the system. This balances pressures in the system and provides for the accommodation of expansion and contraction of the brake fluid. In the present construction, no such spring-pressed check valve is employed together with the associated means for holding it in open position when the apparatus is de-energized. Pressure balancing together with expansion and contraction of the brake fluid is taken care of through the restricted port 66. Flow of fluid upon initial depression of the brake pedal takes place in one direction around the resilient lip 62, and this flow takes up play between the brake shoes and drums, thus minimizing the quantity of fluid which must be displaced by operation of the booster motor.

As soon as the brake shoes engage the drums, a pressure increase above the residual pressure in the system will take place in the master cylinder 43. The spring 112 biases the plunger 120 upwardly and exerts sufficient force to overcome the residual pressure in the master cylinder 43, thus normally holding the lever 102 in the position shown in Figure 3. The spring 112 is overcome by increased pressures in the master cylinder 43 which operate to move the plunger 120 downwardly.

Downward movement of the plunger 120 transmits similar movement to the thimble 103 to move downwardly the center of the lever 102. The spring 127 biases the lever end 126 upwardly while at the time referred to, the opposite end of the lever 102 is free to move downwardly. Hence, the lever 102 initially fulcrums at its point of contact with the ball valve 93, whereupon, the lever end 124 moves downwardly to seat the valve 85. This operation disconnects the vacuum chamber 81 from the chamber 114, the latter chamber being in communication through pipe 131 with the motor chamber 132. Vacuum is always present in the chamber 77 through port 82, and the chamber 77, in turn, is always in communication with the motor chamber 133, thus maintaining vacuum therein.

When the point is reached at which the valve 85 is seated, the lever end 124 can no longer move downwardly. Additional movement transmitted to the center of the lever 102 will now cause the lever to fulcrum at its point of engagement with the nut 125, thus moving the lever end 126 downwardly and releasing the ball valve 93. Air now flows past this valve into chamber 114 and thence through pipe 131 into the motor chamber 132. This action establishes differential pressures in the motor chambers 132 and 133 and the head 16 will now move toward the right in Figure 1.

Energization of the motor 10 takes up play between the rod 23 and plunger 58 to move the latter toward the right in Figure 1. Upon very slight movement of the plunger 58, the port 66 will be closed by the lip 62 of the cup 61, thus closing communication between the master cylinder 43 and the annular space 46. Movement of the plunger 58 will then build up progressively increasing pressures in the master cylinder 43 to assist in the brake application. Pressure generated in the master cylinder 43 will be greater than pedal-generated pressures in the space 59, and accordingly, the lip 62 will be expanded into snug engagement with the inner face of the sleeve 40. The cup 61 thus prevents any reverse flow of fluid toward the master cylinder. Fluid acting to the left of the plunger 58 assists the motor in generating the brake-applying pressures. The operator accordingly performs a predetermined proportion of the work of applying the brakes and a reaction "feel" is transmitted back to the pedal 50.

The specific valve mechanism shown forms no part per se of the present invention as previously stated, and is more fully described in the co-pending application of Jeannot G. Ingres, Serial No. 455,647, filed September 13, 1954.

It will be apparent, however, that the positions of the valves 85 and 93 will be controlled by the lever 102 and movement of this lever, in turn, is controlled in accordance with pressure above the plunger 120 and differential pressures in the chambers 77 and 114. The chambers 114 and 77 always have present therein, respectively, the pressures in the motor chambers 132 and 133. Accordingly, a follow-up action of the head 16 occurs.

The operation of the parts will be reversed when the brakes are to be released. When the pedal 50 is released, pressure back of the plunger 58, which preferably has been assisting the motor in applying the brakes, will drop, and accordingly there will occur a drop in pressure in the master cylinder 43 and the spring 112 will move the center of the lever 102 upwardly, thus relieving pressure on the spring 127. This spring promptly seats the ball 93 to disconnect the chamber 114 from the atmosphere, and the lever end 124 will move upwardly. The higher pressure in the chamber 114 will move the valve 85 from its seat, thus reconnecting the chamber 114 to the source of vacuum, assisted by the small spring surrounding the stem 86.

The structure of the motor also is important. In the first place, the advantages of a diaphragm motor are obtained without the disadvantages thereof, since it is unnecessary to use complementary casing sections having outstanding flanges of substantial width to clamp the diaphragm therebetween. It also is unnecessary to provide the clamping ring which ordinarily surrounds such flanges. Accordingly, the diameter of the motor is minimized. At the same time, the friction of a piston operating in a cylinder is eliminated, resistance to movement of the head 16 being negligible. Moreover, the bellows 25 being flexible, the axis of the nut 20 always accommodates itself to the axis of the bearing 68, thus making it unnecessary to accurately guide the rod 23 with respect to the axis of a piston operating in a cylinder.

The structure of the motor is further advantageous from the standpoint of economy in production and assembly. With the nut 69 in position, the assembled bellows 25, plates 16 and 17 and the assembly for the rod 23 are brought into position, whereupon the rod 23 is inserted through the nut 69, bearing 68 and seal 71 into the recess 56. The bead 27 of the bellows is then snapped into the groove 28. The cylinder 13 is then slipped into position and positively prevents dislodgement of the bead 27. It then merely is necessary to insert the screws 29. The parts are simple and capable of extremely economical production, and assembly time is very much reduced.

In the event of a failure of power in the motor, for example, if the vacuum conduit breaks, operation of the valve mechanism upon depression of the brake pedal of course will fail to energize the motor. Fluid displaced into the annular space 46 will flow through ports 60 into space 59 and through ports 67, thus subjecting the back areas of the plunger 58 instantly to pedal-generated pressures in the master cylinder 49. This pressure cannot be balanced in the master cylinder 43 because of the restricted size of the port 66 and because of the expansibility of the brake cylinders which will initially accommodate any restricted flow of fluid into the master cylinder 43 through the port 66.

Accordingly, pedal-generated pressures back of the plunger 58 will radially deform the cup lip 62, and fluid will flow around this lip into the master cylinder 43, and then through the brake lines. Thus the brake will be applied by the pedal-generated pressures. There will be no tendency for the motor rod 23 to move. Therefore, the operator is not called upon to move the motor parts or to compress the return spring 134, the force of which obviously builds up during the normal brake application.

It is to be understood that the form of the invention illustrated in a preferred embodiment thereof, but that such changes may be made in the apparatus as do not depart from the scope of the appended claims.

I claim:

1. A booster brake mechanism comprising a pedal operable master cylinder, a power operable master cylinder comprising a body and a plunger slidable therein dividing the interior of said body into a pair of spaces one of which is connected to communicate with the vehicle wheel cylinders, a motor having solely an abutting force transmitting engagement with and biased away from said plunger and operable for moving said plunger to displace fluid from said one space, and a control mechanism connected for controlling said motor and connected to be operable by fluid displaced from said pedal operable master cylinder for operating said motor, said pedal operable master cylinder being connected to the other space of said pair to operate said plunger during power failure, said cylinder body having portions defining therein a chamber elongated longitudinally of the direction of movement of said plunger and connected to communicate with said pedal operable master cylinder, one end of said chamber being connected to communicate with the other of said spaces and the other end of said chamber being connected to communicate with said one space solely through an orifice in said body in close proximity to and in advance of said plunger when the latter is in a normal off position, said plunger having means providing for the flow of fluid solely in one direction from said other space to said one space.

2. A booster brake mechanism comprising a pedal operable master cylinder, a power operable master cylinder having a plunger slidable therein dividing it to form a pair of spaces one of which is connected to communicate with the vehicle wheel cylinders, a motor having force transmitting engagement with said plunger and energizable for moving said plunger to displace fluid from said one space, and a control mechanism connected to control said motor and connected to be operable by fluid displaced from said pedal operable master cylinder for operating said motor, said power operable master cylinder comprising a body and a sleeve fixed therein in which said plunger is movable, said body and said sleeve defining therebetween an elongated annular chamber communicating with said pedal operable master cylinder, one end of said chamber communicating with the other of said spaces, said sleeve being provided with a restricted orifice therethrough communicating at one end with said chamber and at its other end with said one space adjacent said plunger when the latter is in a normal off position, said plunger having means arranged to provide for the flow of fluid solely in one direction from said other space to said one space.

3. A booster brake mechanism comprising a pedal operable master cylinder, a power operable master cylinder having a plunger slidable therein dividing it into a pair of spaces one of which is connected to communicate with the vehicle wheel cylinders, a fluid pressure motor having solely an abutting force transmitting engagement with and biased away from said plunger to move the latter and displace fluid from said one space, a chamber in constant communication with the other of said spaces and with said pedal operable master cylinder for moving said plunger from a normal position independently of said motor during power failure, said plunger having means arranged to provide for the flow of hydraulic fluid from said other space to said one space past said plunger but preventing reverse flow of such fluid, said power operable master cylinder having an orifice communicating at one end with said chamber and communicating at its other end with said power operable master cylinder solely at a point adjacent and in advance of said plunger when the latter is in a normal off position, and a control valve mechanism connected to control said motor and comprising an operating plunger connected to be subject to pressures in said chamber.

4. Apparatus constructed in accordance with claim 3 wherein said power operable master cylinder comprises a unit having portions arranged to define said chamber, said chamber being elongated axially of said power operable master cylinder and communicating at one end with said other space and at its other end with said orifice.

5. A booster brake mechanism comprising a pedal operable master cylinder, a power operable master cylinder having a plunger slidable therein dividing it into a pair of spaces one of which is connected to communicate with the vehicle wheel cylinders, a fluid pressure motor having force transmitting engagement with said plunger to move the latter and displace fluid from said one space, a chamber in constant communication with the other of said spaces and with said pedal operable master cylinder, said plunger having means arranged to provide for the flow of hydraulic fluid from said other space to said one space past said plunger and preventing reverse flow of such fluid, said power operable master cylinder having an orifice communicating at one end with said chamber and communicating at its other end with said power operable master cylinder solely at a point adjacent and in advance of said plunger when the latter is in a normal off position, and a control valve mechanism connected to control said motor and comprising an operating plunger connected to be subject to pressures in said chamber, said power operable master cylinder comprising a body having a sleeve fixed therein in which said plunger is slidable, said body and said sleeve being annularly spaced to form said chamber.

6. A booster brake mechanism comprising a pedal operable master cylinder, a power operable master cylinder, having a plunger slidable therein dividing it to form a pair of spaces one of which is connected to communicate with the vehicle wheel cylinders, a chamber connected to communicate with said pedal operable master cylinder and in fixed communication with the other of said spaces, said power operable master cylinder having an orifice connected to communicate at one end with said chamber and at its other end with said one space solely at a point adjacent and in advance of said plunger when the latter is in a normal off position, said plunger comprising a head having a flexible cup carried thereby in said one space, said cup having an annular flexible lip projecting into said one space to be deformed for the flow of fluid from said other space to said one space when pressure in the former is higher than pressure in the latter, a motor having solely an abutting force transmitting engagement with and biased away from said plunger, and a control mechanism connected to control said motor and connected to be operable upon displacement of fluid from said pedal operable master cylinder for operating said motor, pedal operable master cylinder generated pressure moving said plunger from a normal position in the absence of motor energization.

7. Apparatus constructed in accordance with claim 6 wherein said motor is a fluid pressure motor and said control mechanism is a valve mechanism connected for controlling pressures in said motor, said valve mechanism comprising an operating plunger connected to be subject to pressures in said chamber to be moved by an increase in pressure therein to operate said control valve mechanism and energize said motor.

8. A booster brake mechanism comprising a pedal operable master cylinder, a power operable master cylinder having a plunger slidable therein dividing it to form a pair of spaces one of which is connected to communicate with the vahicle wheel cylinders, a chamber connected to communicate with said pedal operable master cylinder and in fixed communication with the other of said spaces, said power operable master cylinder having an orifice connected to communicate at one end with said chamber and at its other end with said one space solely at a point adjacent and in advance of said plunger with the latter in a normal off position, said plunger comprising a head having a flexible cup carried thereby in said one space, said cup having an annular flexible lip projecting into said one space to be deformed by the flow of fluid from said other space to said one space when pressure in the former is higher than pressure in the latter, a motor having force transmitting engagement with said plunger, and a control mechanism connected to control said motor and connected to be operable upon displacement of fluid from said pedal operable master cylinder for operating said motor, said power operable master cylinder comprising a body, and a sleeve fixed therein in which said plunger is slidable, said sleeve being annularly spaced from said body to form said chamber.

9. A booster brake mechanism comprising a pedal operable master cylinder, a power operable master cylinder having a plunger slidable therein dividing it to form a pair of spaces one of which is connected to communicate with the vehicle wheel cylinders, a chamber connected to communicate with said pedal operable master cylinder and in fixed communication with the other of said spaces, said power operable master cylinder having an orifice connected to communicate at one end with said chamber and at its other end with said one space solely at a point adjacent and in advance of said plunger with the latter in a normal off position, said plunger comprising a head having a flexible cup carried thereby in said one space, said cup having an annular flexible lip projecting into said one space to be deformed by the flow of fluid from said other space to said one space when pressure in the former is higher than pressure in the latter, a motor having force transmitting engagement with said plunger, and a control mechanism connected to control said motor and connected to be operable upon displacement of fluid from said pedal operable master cylinder for operating said motor, said power operable master cylinder comprising a body, and a sleeve fixed therein in which said plunger is slidable, said sleeve being annularly spaced from said body to form said chamber, said motor being a fluid pressure motor and said control mechanism being a valve mechanism connected for controlling pressures in said motor, said valve mechanism comprising a cylinder in open communication with said chamber, and an operating plunger in said last-named cylinder subject to pressures in said chamber to be moved in one direction by an increase in pressure in said chamber to energize said motor.

References Cited in the file of this patent

UNITED STATES PATENTS

| | | |
|---|---|---|
| 1,879,667 | Farmer et al. | Sept. 27, 1932 |
| 2,207,700 | Porter | July 16, 1940 |
| 2,292,703 | Lawler | Aug. 11, 1942 |
| 2,328,637 | Freeman | Sept. 7, 1943 |
| 2,407,856 | Stelzer | Sept. 17, 1946 |
| 2,433,953 | Ingres | Jan. 6, 1948 |
| 2,438,723 | Stelzer | Mar. 30, 1948 |
| 2,450,160 | Price | Sept. 28, 1948 |
| 2,455,985 | Elliott | Dec. 14, 1948 |
| 2,658,328 | Stelzer | Nov. 10, 1953 |
| 2,664,707 | Edge | Jan. 5, 1954 |
| 2,705,402 | Stelzer | Apr. 5, 1955 |
| 2,761,427 | Shumaker | Sept. 4, 1956 |
| 2,787,122 | Price et al. | Apr. 2, 1957 |